(12) United States Patent
Hegerath et al.

(10) Patent No.: US 7,401,689 B2
(45) Date of Patent: Jul. 22, 2008

(54) HYDRAULIC SYSTEM PROVIDING PRESSURE AND VOLUME FLOWS IN A DOUBLE-CLUTCH TRANSMISSION

(75) Inventors: Andreas Hegerath, Bergheim (DE); Martin Leibbrandt, Bedburg (DE); Reinhard Moehlmann, Köln (DE); Ulrich Eggert, Viersen (DE)

(73) Assignee: Getrag Ford Transmissions GmbH, Koln (DE)

( * ) Notice: Subject to any disclaimer, the term of this patent is extended or adjusted under 35 U.S.C. 154(b) by 214 days.

(21) Appl. No.: 11/250,217

(22) Filed: Oct. 14, 2005

(65) Prior Publication Data

US 2006/0054442 A1 Mar. 16, 2006

(51) Int. Cl.
*B60W 10/02* (2006.01)
*B60W 10/10* (2006.01)
*F16D 13/72* (2006.01)
*F16D 13/74* (2006.01)

(52) U.S. Cl. .................................. 192/3.58; 192/113.35
(58) Field of Classification Search ............. 192/113.35
See application file for complete search history.

(56) References Cited

U.S. PATENT DOCUMENTS

| 3,823,801 | A | * | 7/1974 | Arnold | 192/87.19 |
| 5,669,479 | A | * | 9/1997 | Matsufuji | 192/87.15 |
| 2006/0054447 | A1 | * | 3/2006 | Hegerath et al. | 192/113.3 |

FOREIGN PATENT DOCUMENTS

| DE | 10306895 | | 2/2004 |
| EP | 1413803 | | 4/2004 |
| JP | 01188723 | A * | 7/1989 |

* cited by examiner

*Primary Examiner*—Richard M Lorence
(74) *Attorney, Agent, or Firm*—MacMillan, Sobanski & Todd, LLC

(57) ABSTRACT

A hydraulic system for providing pressure and volume flows in a double-clutch transmission. A first clutch and a second clutch are preceded by at least one changeover valve which, in a first state, guides lubricating flow to the first clutch and cooling flow to the second clutch, and, in a second state, guides lubricating flow to the second clutch and cooling flow to the first clutch. The cooling flow is preferably variable.

13 Claims, 3 Drawing Sheets

HYDRAULIC SYSTEM PROVIDING PRESSURE AND VOLUME FLOWS IN A DOUBLE-CLUTCH TRANSMISSION

BACKGROUND OF THE INVENTION

The invention relates to a hydraulic system for the provision of pressures and volume flows in a double-clutch transmission, in particular for the provision of a first volume flow for cooling and lubricating a first clutch and for the provision of a second volume flow for cooling and lubricating a second clutch.

In addition to the cooling and lubrication of the clutches, in the double-clutch transmissions known from the prior art the hydraulic system also assumes further tasks. Thus, by means of the hydraulic system, the two clutches can be actuated automatically, and also the selection and deselection of gears of the double-clutch transmission takes place automatically via a plurality of shift actuators.

EP 1413803 describes a method for cooling the two clutches of a double-clutch transmission in a motor vehicle. For carrying out the method, in this case, a hydraulic system by means of which an oil volume flow is provided for each clutch is required. Thus, according to the method, the respective clutch is provided with a volume flow which is dependent on an oil sump temperature, on the temperature of the oil flowing from the respective clutch and on the power which is transmitted by the clutches. A regulating valve or the like must accordingly be provided for each volume flow so that the volume flows can be regulated as a function of the abovementioned factors.

DE 103 06 895 likewise describes a method for cooling the double clutch of a motor vehicle, here the two clutches being jointly acted upon by a single volume flow of a coolant. As compared with cooling by means of two volume flows, this simplifies the construction of the corresponding hydraulic system. However, it is not possible to cool and lubricate a clutch of the double-clutch transmission individually. Thus, in DE 103 06 895, it is proposed to interrupt the overall volume flow of cooling and lubrication, particularly at low temperatures, in order to reduce the drag torque caused by the coolant located in the clutch and therefore to simplify the selection of a gear. In this case, it would be sufficient to interrupt only the volume flow for the clutch which is assigned to that subtransmission of the double-clutch transmission in which a gear is to be selected.

The provision of volume flows for a clutch in each case thus allows a controlled cooling and lubrication of the two clutches with more degrees of freedom. As a rule, however, this leads to a higher number of hydraulic components and, in particular, to a higher number of costly regulating valves. Moreover, the design of the hydraulic system must take into account the fact that, in the event of a failure of one or more of its components, at least an emergency operation of the double-clutch transmission should be possible.

SUMMARY OF THE INVENTION

A hydraulic system according to this invention provides pressure and volume flows in a double-clutch transmission. A first clutch and a second clutch are preceded by at least one changeover valve which, in a first state, guides lubricating flow to the first clutch and cooling flow to the second clutch, and, in a second state, guides lubricating flow to the second clutch and cooling flow to the first clutch. The cooling flow is preferably variable.

An advantage of the present invention is that a hydraulic system provides volume flows and pressures in a double-clutch transmission, in particular for lubricating and cooling the two clutches of the double-clutch transmission, which is simply constructed, can be produced cost-effectively and, even in the event of a failure of one of its components, continues to provide the pressures and volume flows necessary for the double-clutch transmission to operate.

The first and the second clutch are preceded by at least one changeover valve which, in a first position, guides a lubricating flow to the first clutch and a cooling flow to the second clutch and, in a second position, guides the lubricating flow to the second clutch and the cooling flow to the first clutch. In this case, in the first position, the lubricating flow contributes to the first volume flow which is used for cooling and lubricating the first clutch, while, in the second position of the changeover valve, the cooling flow is used for cooling and lubricating the first clutch. This also applies similarly to the second clutch: the second volume flow for cooling and lubricating the second clutch is fed either by the cooling flow or by the lubricating flow. This means that, for example in the event of a failure of the cooling flow or of the lubricating flow, both clutches can basically continue to be cooled and lubricated, in that the changeover valve is switched into the position required in each case. The coolant and lubricant used are preferably oil.

If, by contrast, the changeover valve can no longer be switched, one clutch is lubricated and cooled by means of only the lubricating flow and the other clutch by means of only the cooling flow. If the cooling and lubricating flows are designed in such a way that they ensure in themselves a sufficient cooling and lubrication of a clutch, it is possible for the double-clutch transmission to continue to operate, even when the changeover valve is no longer switchable. Only if the changeover valve and the cooling flow or lubricating flow fail simultaneously can one of the two clutches no longer be cooled and lubricated.

Preferably, the sum of the first and the second volume flow for cooling and lubricating the first and second clutch corresponds to the sum of the cooling flow and of the lubricating flow. Consequently, the volume flows for cooling and lubricating the two clutches are fed solely from the lubricating flow or the cooling flow. This means that, for example in the first position of the changeover valve, the second clutch is cooled and lubricated only by means of the cooling flow. The entire coolant and lubricant for cooling and lubricating the clutches are thus routed via the changeover valve.

In a preferred exemplary embodiment, the changeover valve is preceded by a control valve which regulates the cooling flow. The cooling flow can be varied within limits by means of the control valve. Preferably, the volume flow can be varied in a range of 0 liters per minute up to a maximum value, for example 20 liters per minute.

Preferably, in the absence of a signal by means of which the control valve is activated, the cooling flow is different from zero. This ensures that the control valve even allows the cooling flow when, for example, the signal-carrying line to the control valve is interrupted or when the signal-generating signal element has failed. Consequently, a first and a second volume flow for cooling and lubricating the clutches continues to be available, even in the event of a failure of the signal for the control valve, since the cooling flow can in each case be guided to both clutches.

The control valve is preferably designed as a 2/3-way valve with one inlet and with one outlet. In a first position of the control valve, a diaphragm, which allows a defined volume flow between the inlet and the outlet of the control valve, is connected between inlet and outlet. In a second position of the control valve, the inlet and outlet are separated. The cooling flow is thereby set at zero. In a third position, the inlet and outlet are connected, so that the coolant or oil can flow, unimpeded, through the control valve and a maximum cooling flow is established. The 2/3-way valve is in this case designed in such a way that the first position is assumed when a signal value is equal to zero. This may be implemented, for example, by means of a spring which presses the directional valve into this first position in the absence of the signal.

In a preferred exemplary embodiment, the 2/3-way valve can be changed over between its positions several times per second. If, for example, it is switched to and fro between the second and the third position, this results in a cooling flow which is averaged over time and lies between zero and the maximum cooling flow. By means of the ratio of the switching times, that is to say the times in which the control valve is in each case in the second or the third position, any desired (average) value for the cooling flow can be set. If, for example, the ratio of the switching time of the second position to the switching time of the third shift actuator. For example, to switch the changeover valve, a signal element can be used which, when it generates a signal, selects the shift actuators for selecting/deselecting the gears of a first subtransmission. By means of the corresponding signal, the changeover valve is likewise activated and switched into the second position, so that the first clutch, which is assigned to the first subtransmission, is acted upon by the variable cooling flow. In order to ensure an easy selection of the gears in the first subtransmission, the cooling flow is set at zero, so that, in the first clutch, the drag torque, caused by the oil located in the first clutch, is reduced or is set at zero. A separate signal element for the changeover valve can thus be dispensed with, in that the special relationships in the shift logics of the hydraulic system are utilized in the double-clutch transmission.

In principle, to switch the changeover valve, any desired signal element already having another use in the hydraulic system could also be used. In this case, it is necessary merely to ensure that this respective signal element is employed to switch the changeover valve only in the times in which it is not employed for the other use.

It is also possible that the changeover valve can be activated by means of a signal from at least one signal element by means of which the first or the second clutch can be shifted in a pressureless manner. If, for example, the signal from a signal element leads to the first clutch being shifted in a pressureless manner, this signal may be used to switch the changeover valve into its second position. The result of this is that the clutch shifted in a pressureless manner is acted upon by the variable cooling flow which can be set at the value zero. As already described above, the gears of the first subtransmission could then be selected easily since the drag torque in the first clutch is reduced.

In a preferred exemplary embodiment, the changeover valve can be activated by means of signals from at least one signal element for shift actuator selection and from at least one signal element for the pressureless shift of one of the shift clutches, the signal from the signal element for the pressureless shift of position is 1:1, and if a maximum cooling flow of 20 l/min is assumed, an average cooling flow of 10 l/min is obtained.

Preferably, the changeover valve may be preceded by a diaphragm, by means of which the lubricating flow can be set to a constant value. Thus, since the probability of the failure of a diaphragm is very low, a lubricating flow is present whenever there is a pressure upstream of the diaphragm, said pressure preferably being regulated by means of a main pressure regulator of the double-clutch transmission.

In a preferred exemplary embodiment, the changeover valve can be changed over between the first and the second position several times per second, preferably up to 20 times per second. Since the changeover valve switches to and fro between the first and the second position at a defined frequency, the variable cooling flow and the lubricating flow can be apportioned, as desired, to the first and the second clutch. Owing to the interaction of the quick-switchable changeover valve and of the control valve for the cooling flow, the volume flows for the two clutches can be varied within wide limits. If, for example, the changeover valve is switched to and fro between the first and the second position, and the switching time in which the changeover valve remains in the first position corresponds to the switching time in which the changeover valve remains in the second position, equal volume flows for the first and the second clutch are obtained. If the ratio of the switching times is set otherwise, the ratio of the first and second volume flows can be varied and regulated correspondingly. If, for example, during switching to and fro, the switching time of the first position is double the switching time of the second position, the first clutch is supplied with a volume flow which is composed of two parts of lubricating flow and one part of cooling flow.

In a preferred exemplary embodiment, the changeover valve can be activated by means of a signal from at least one signal element, which is used for selecting a shift actuator, for selecting a group of shift actuators from a plurality of shift actuators in the double-clutch transmission or for selecting a chamber of a the clutch being stronger than the signal from the signal element for shift actuator selection. If, for example, neither of the clutches is shifted in a pressureless manner, there is at the changeover valve no signal for the pressureless shift of the clutch or clutches. In this case, by means of the signal element for shift actuator selection, the changeover valve can be switched to and fro, as desired, on the precondition that, in this shift state of the two clutches, there is no provision for shift actuator selection. The term "shift actuator selection" is in this context also to embrace the selection of a chamber of a shift actuator. The latter may be designed as a double-acting shift cylinder with two chambers.

If, however, there is a signal from a signal element for the pressureless shift of a clutch, the signal from the signal element for shift actuator selection has no influence on the position of the changeover valve.

The changeover valve can preferably be activated by means of at least one hydraulic element, by which the regulation of force for the shift actuators can be carried out. A separate component for generating a signal for activating the changeover valve may thereby be dispensed with.

DESCRIPTION OF THE DRAWINGS

The invention is explained in more detail with reference to the exemplary embodiments illustrated in the figures in which.

DESCRIPTION OF THE PREFERRED EMBODIMENT

Figure 1:
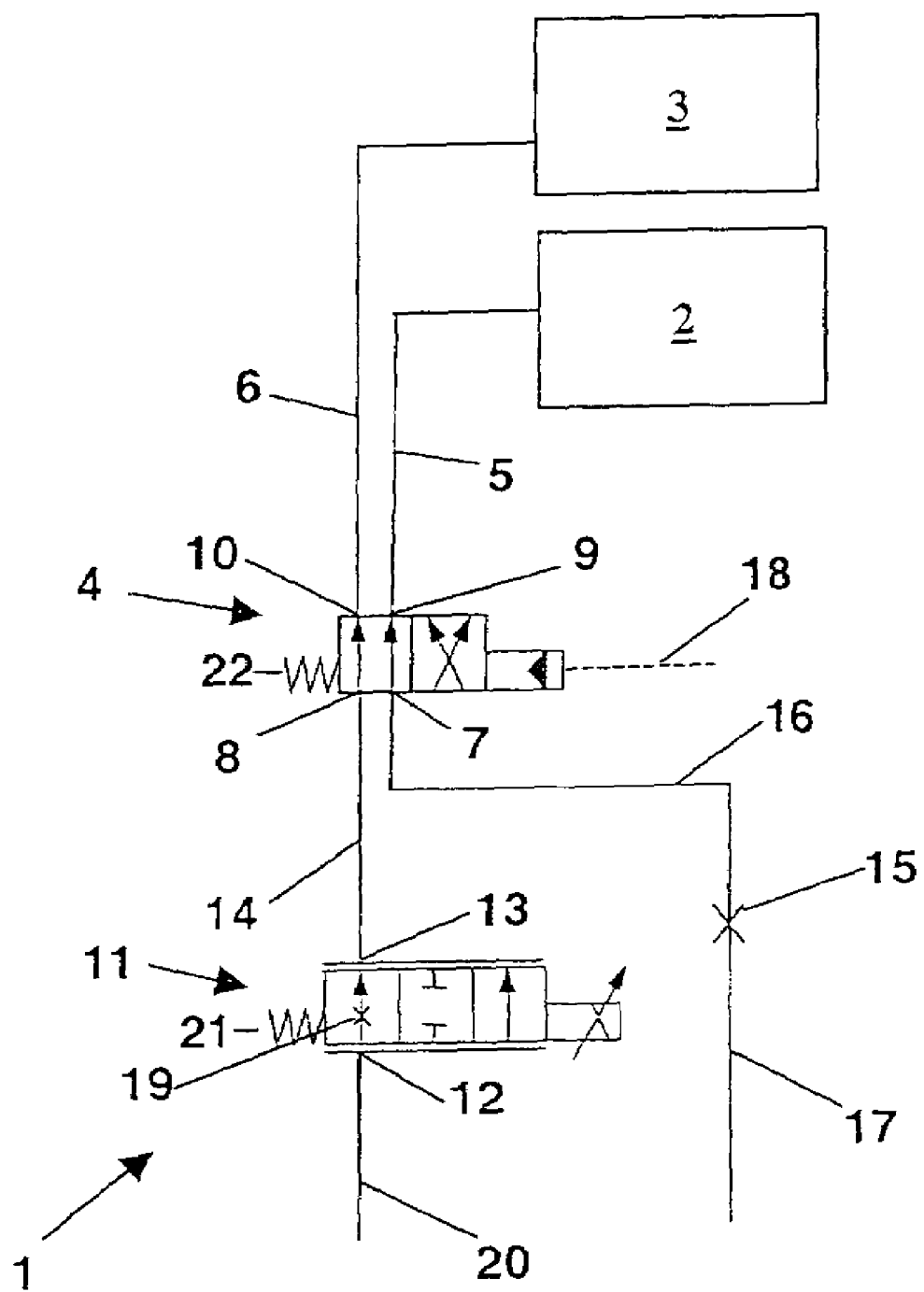
FIG. 1 shows a detail of a block diagram of a first exemplary embodiment of the invention.

FIG. 1 shows a detail of a block diagram of a hydraulic system according to the invention, designated in general by 1. The hydraulic system 1, inter alia, cools and lubricates a first clutch 2 and a second clutch 3 of a double-clutch transmission, not illustrated in any more detail.

The first clutch 2 and the second clutch 3 are preceded by a changeover valve 4. The changeover valve 4 is connected to the first clutch 2 via a line 5 and to the second clutch 3 via a line 6. The changeover valve 4 is designed as a 4/2-way valve with a first and a second inlet 7, 8 and with a first and a second outlet 9, 10. The hydraulic line 5 connects the first outlet 9 of the changeover valve 4 to the first clutch 2, while the hydraulic line 6 connects the second outlet 10 to the second clutch 3.

The second inlet 8 of the changeover valve 4 is preceded by a control valve 11 which is designed as a 2/3-way valve with an inlet 12 and with an outlet 13. A line 14 connects the outlet 13 of the control valve 11 to the second inlet 8 of the changeover valve 4. A diaphragm 15, which precedes the first inlet 7 of the changeover valve 4, ensures constant volume flow in line 16, provided a constant pressure prevails upstream of the diaphragm 15 in the feed line 17. The line 16 connects the diaphragm 15 to the first inlet 7 of the changeover valve 4. The volume flow in the line 16 is designated below as the lubricating flow.

FIG. 1 shows the changeover valve 4 in a spring-loaded position at rest which is to correspond to a first position of the changeover valve 4. As may be gathered from the illustration, in the first position, the changeover valve 4 connects the outlet 13 of the control valve 11 to the second clutch 3 and the feed line 17 or the line 16 to the first clutch 2.

In response to a signal being applied via a signal line 18, the changeover valve can be switched into a second position, in which the control valve 11 is connected to the first clutch 2 and the line 16 is connected to the second clutch 3.

The control valve 11 can assume three positions: in the first position (illustrated in FIG. 1), between the inlet 12 and the outlet 13 a diaphragm 19 is inserted, which ensures a specific volume flow in the line 14 when a constant pressure prevails upstream of the control valve 11 in a feed line 20. In a second position, the inlet 12 and outlet 13 are separated from one another, with the result that no coolant or lubricant, preferably in the form of oil or transmission fluid, flows in the line 14. In the third position of the control valve 11, the inlet 12 and outlet 13 are connected without a diaphragm or the like, thus leading, in the case of a given pressure in the feed line 20, to a maximum volume flow in the line 14.

Depending on the operating state of the control valve 11, a different volume flow, which is to be designated here as the cooling flow, is established in the line 14. By switching between, for example, the second and the third position of the control valve 11, a time-averaged cooling flow can be set which lies between 0 liters/min and the maximum volume flow, mentioned above, in hydraulic line 14. If the control valve is actuated with a sufficiently high frequency, a uniform cooling flow rate between zero and the maximum value is established in line 14.

The control valve 11 is switched by the application of an electric current I applied to the solenoid that control valve 11. In the case of a current I equal to zero, a spring 21 presses the control valve 11 into the first position. This means that, in the event of a fault in the activation of the control valve 11 which leads to a failure of the current I, a defined volume flow or cooling flow dependent on the diaphragm 19 is ensured. In the case of a maximum current $I_{max}$, as would occur in the event of a short circuit, the control valve 11 is switched into the third position in which a maximum cooling flow is established.

Depending on the position of the changeover valve 4, the variable cooling flow can be conducted to the first clutch 2 or the second clutch 3, while the constant lubricating flow in the line 16 is conducted correspondingly to the other clutch in each case. Since the two clutches 2, 3 are cooled and lubricated exclusively by means of the flows through the line 14 (cooling flow) and through the line 16 (lubricating flow), when the changeover valve 4 is in the first position, the lubricating flow corresponds to a first volume flow in the line 5 which cools and lubricates the first clutch 2. The cooling flow in the line 14 correspondingly constitutes a second volume flow in the line 6 which cools and lubricates the second clutch 3.

The provision, illustrated in FIG. 1, of volume flows for cooling and lubricating the clutches 2 and 3 is available even in the event of the failure of individual components or signals. If the signal carried on signal line 18 fails, the changeover valve 4 can no longer be switched. A spring 22 ensures that, in this case, the first position illustrated in FIG. 1 is assumed. If the cooling flow through the line 14 and the lubricating flow through the line 16 are sufficiently large, both clutches 2, 3 continue to be cooled and lubricated, so that at least emergency operation is possible. If the current I for the control valve 11 fails, the control valve 11 switches into its first position on account of the spring 21, with the result that a defined cooling flow passes through the diaphragm 19 to the changeover valve 4.

Because the changeover valve 4 is switched quickly at high frequency, the variable cooling flow from the control valve 11 and the lubricating flow predetermined by the diaphragm 15 can be apportioned in equal parts to the two clutches 2, 3. It is also possible to carry out appropriate weighting by means of different switching times: for example, when switching between the two states, the changeover valve could remain in the first state for two time units and in the second state for one time unit. The first volume flow for cooling and lubricating the first clutch 2 would then be composed, on average, of two parts of lubricating flow and of one part of cooling flow.

Figure 2:
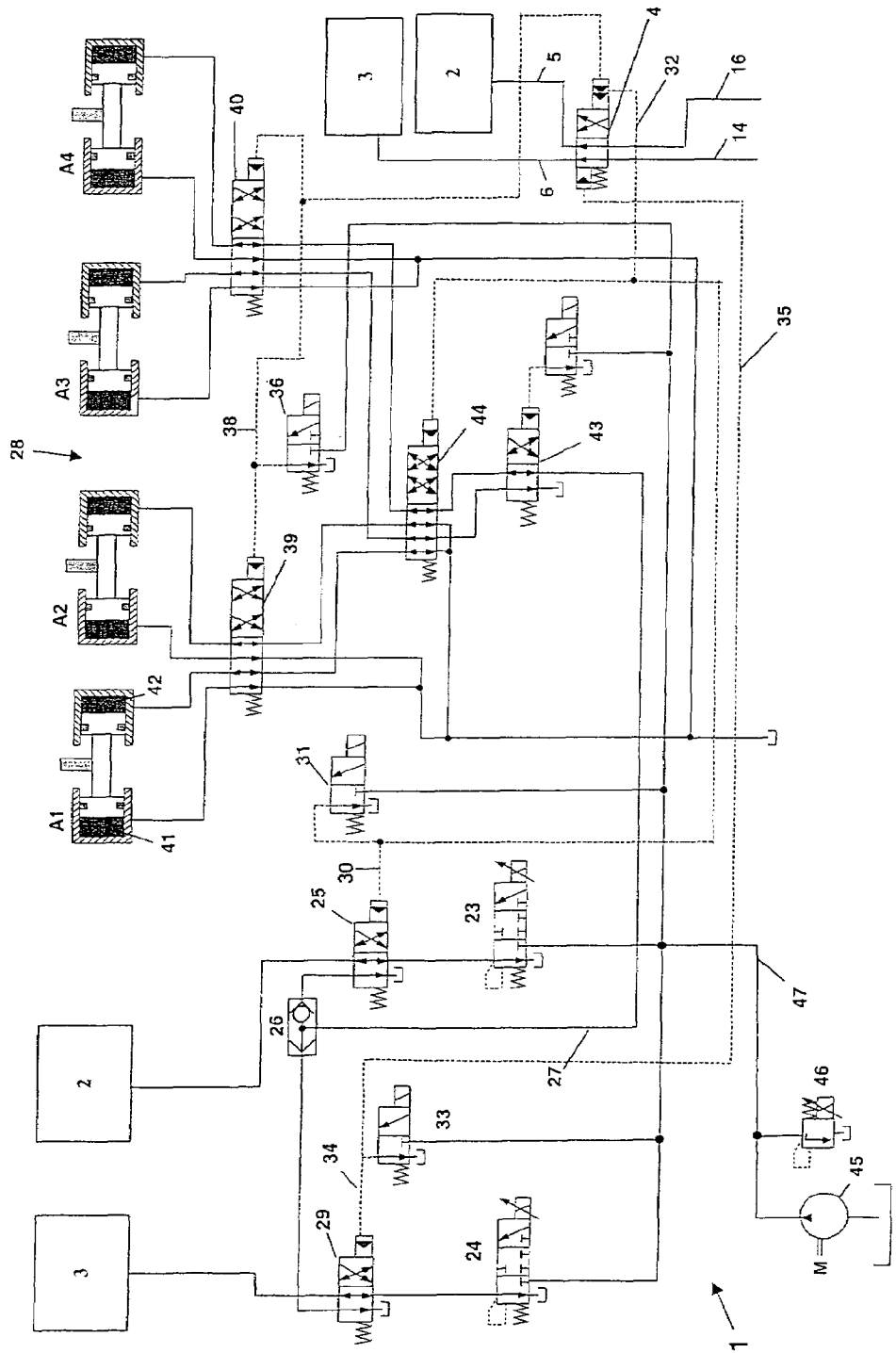
FIG. 2 is a schematic diagram of a hydraulic system, of which the detail shown in FIG. 1 is a part.

FIG. 2 shows the detail of FIG. 1 in modified form, with further parts of the hydraulic system 1. The detail of FIG. 1 is located on the right side of FIG. 2, but control valve 11, diaphragm 15 and the associated feed lines 17, 20 are not illustrated there.

In addition to the subsystem for cooling and lubricating the first and second clutches 2, 3 shown in FIG. 1, the hydraulic system 1 comprises a first pressure regulator 23 and a second pressure regulator 24. The pressure regulators 23, 24 provide regulated hydraulic pressures, by means of which either the first and second clutch 2, 3 or one of the four shift actuators A1 to A4 can be actuated. A changeover valve 25 is located between the first pressure regulator 23 and the first clutch 2. By means of this changeover valve 25, the regulated pressure of the pressure regulator 23 can be applied either to the first clutch 2 or to a changeover switch 26, connected by a line 27 to a shift system 28 that includes the shift actuators A1 to A4.

Similarly, between the second clutch 3 and the second pressure regulator 24, a changeover valve 29 is inserted, which applies the pressure regulated by the pressure regulator 24 either to the second clutch 3 or to the changeover switch 26. As a function of the pressures prevailing on the inlet side, the changeover switch 26 makes either a connection between the changeover valve 25 and the shift system 28 or a connection between the changeover valve 29 and the shift system 28.

The changeover valve 25 is switched by means of hydraulic control pressure, which is supplied by a control line 30. The control line 30 connects the changeover valve 25 to a signal element 31 which is activated electromagnetically. It can be seen that the control pressure of the signal element 31 is also switched to the changeover valve 4 via line 32.

The changeover valve 29 is also assigned a signal element 33, which generates a control pressure that is connected to the changeover valve 29 via a signal line 34. The control pressure of the signal element 33 is routed to the changeover valve 4 via a signal line 35. As may be gathered from FIG. 2, the control pressure of the signal element 33 ensures that the changeover valve 4 is forced into its first position, while the control pressure of the signal element 31 forces the changeover valve 4 into its second position counter to the force of the spring 22.

Furthermore, the changeover valve 4 is activated by control pressure, generated by another signal element 36. The signal element 36 is connected to the changeover valve 4 via a line 38. The signal element 36, via line 38, switches two chamber selection valves 39, 40, which are arranged between the shift actuators A1 to A4 and the line 27. So that one of the two chambers 41, 42 of a specific shift actuator A1 to A4 can be acted upon in a controlled way by the pressure prevailing in the line 27, with all the remaining chambers undergoing a simultaneous pressure-less shift, an actuator selection valve 43 and a group selection valve 44 are further provided. In this case, by means of the group selection valve 44, pressure in the line 27 is directed either to actuators A1 and A2 or to actuators A3 and A4. By means of the actuator selection valve 43, either the shift actuator A1 or A2 (respectively A3 or A4) is selected, depending on the position of the group selection valve 44. The group selection valve 44 is activated by means of the same control signal, to be precise by means of the control pressure of the signal element 31, with the result that one signal element can be saved.

A motor-operated pump 45 with a main pressure regulator 46 provides an operating pressure which is present via a distribution system 47, for example, on the inlet side of the pressure regulators 23, 24 or else at the inlet 12 of the control valve 11, described with reference to FIG. 1.

When both the changeover valve 25 and the changeover valve 29 are in the positions illustrated in FIG. 2, the pressures of the pressure regulators 23, 24 are conducted to the clutches 2, 3, respectively. The clutches 2, 3 can in each case transmit torque as a function of the regulated pressures, thus making it possible to have some torque overlap, which is necessary for fading over the torque from one subtransmission of the double-clutch transmission to the other. In this phase, the line 27 is switched to pressure-less operation via the changeover valves 25, 29. Also, in this phase, there are no control pressures from the signal elements 31, 33, so that the changeover valve 4 can be actuated solely by means of the signal element 36. By means of the signal element 36, the variable cooling flow in the line 14 or the constant lubricating flow in the line 16 can be apportioned, as desired, to the clutches 2, 3 according to requirements, for example by rapid switching, as described above.

When a gear is to be selected, for example a gear which can be selected by means of one of the shift actuators A1, A2 which belong to a first subtransmission assigned to the first clutch, the changeover valve 25 is moved to its second state by means of a control pressure of the signal element 31. The first clutch 2 is thereby shifted in a pressure-less manner and opens. On account of the connection via the line 32, the control pressure of the signal element 31 also prevails at the changeover valve 4 and forces the latter into its second state. The cooling flow in the line 14 is thereby directed to the first clutch 2. The cooling flow can then be lowered to 0 liters/min, so that a drag torque caused by the coolant in the first clutch 2 is markedly reduced. A selection of a gear is thereby simplified.

Similarly, the system 1 according to the invention simplifies the shift of a gear by means of the shift actuators A3 and A4, which belong to a second subtransmission of the double-clutch transmission. For this purpose, the second clutch 3 is shifted in a pressure-less manner, the control pressure of the signal element 33 prevailing at the changeover valve 29 and at the changeover valve 4. The control pressure presses the changeover valve 4 into its first state, specifically independently of the signal element 36, since the control pressure of the signal element 33 is higher than the control pressure of the signal element 36. The variable cooling flow reduceable to zero is then conducted to the second clutch 3, with the result that a shift actuator A3, A4 can select a gear without drag torque in the second clutch 3.

Figure 3:
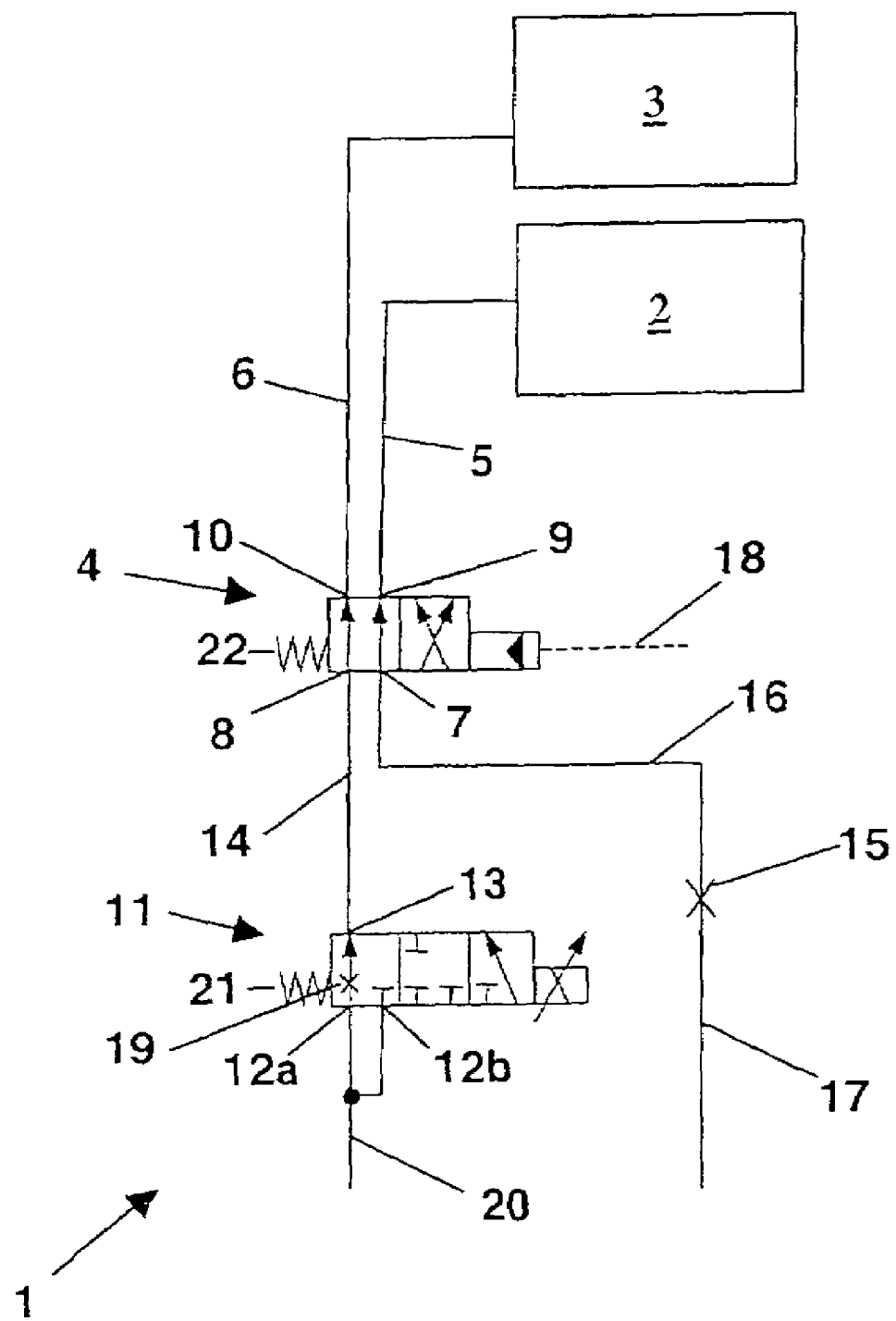
FIG. 3 shows a block diagram of another exemplary embodiment of the invention.

FIG. 3 shows a block diagram of another exemplary embodiment of the invention, in which line 20 includes a bypass passage through which control valve 11 is supplied with a cooling hydraulic flow rate in parallel with line 20. The first state of valve 11 operates as described above with reference to FIG. 1, and the second state closes communication between line 20 and line 14. The third state communicates line 20 directly to line 14, bypassing diaphragm 19 and without regulating the flow rate through valve 11.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A hydraulic system for supplying fluid flow in a double-clutch transmission comprising:
   a first clutch;
   a second clutch;
   a first fluid source;
   a second fluid source;
   a changeover valve communicating with the first and second fluid sources and the first and second clutches, having a first state wherein the first fluid source is directed to the first clutch and the second fluid source is directed to the second clutch, and a second state wherein the first fluid source is directed to the second clutch and the second fluid source is directed to the first clutch.

2. The system of claim 1 wherein the first fluid source provides lubricating fluid and the second fluid source provides cooling fluid.

3. The system of claim 1, wherein the volumetric flow rate through the changeover valve in the first state is substantially equal to the volumetric flow through the changeover valve in the second state.

4. The system of claim 1, wherein a flow rate into the changeover valve from the second fluid source can be varied within a range zero to a maximum flow rate.

5. The system of claim 1, further comprising:
   a control valve having an output communicating with an input of the changeover valve, for alternately opening and closing flow through said output and for regulating a variable flow rate through said output into the changeover valve from the second fluid source.

6. The system of claim 5, wherein the control valve has multiple states and further comprises:
   a solenoid normally supplied with an electric signal to which the solenoid responds by producing a desired state of the control valve corresponding to the signal, and wherein, in the absence of the signal, a flow rate from the second fluid source through the control valve is greater than zero.

7. The system of claim 6, wherein the control valve further includes an inlet communicating with the second fluid source, the control valve having three states:
a first state in which the control valve maintains a constant flow rate between said inlet and said outlet in response to a frequency of the signal;
a second state wherein communication though the control valve between said inlet and said outlet is prevented; and
a third state wherein the control valve connects said inlet and said outlet.

8. The system of claim 7, wherein a first frequency at which the state of the control valve is changed is in a range whose upper limit is equal to 20 cycles per second.

9. The system of claim 1, further comprising:
a diaphragm located in a flow path between the first fluid source and the changeover valve, said diaphragm maintaining a flow rate therethrough at a constant magnitude.

10. The system of claim 1, wherein a second frequency at which the state of the changeover valve is changed is in a range whose upper limit is equal to 20 cycles per second.

11. The system of claim 1 farther comprising:
multiple shift actuators, each shift actuator including a chamber; and
a signal element producing a control signal for selecting at least one of a shift actuator, a group of shift actuators, and a chamber of a shift actuator.

12. The system of claim 1, wherein the first clutch has an engaged state and a disengaged state, the system further comprising:
a second changeover valve for opening and closing communication between the second fluid source and the first clutch;
a signal element producing a control signal for activating the second changeover valve, whereby the state of the first clutch is changed in a pressure-less manner in response to said control signal activating the second changeover valve.

13. The system of claim 1, wherein the first clutch has an engaged state and a disengaged state, and the second first clutch has an engaged state and a disengaged state, the system further comprising:
a second changeover valve for opening and closing communication between the second fluid source and the first clutch;
a third changeover valve for opening and closing communication between the second fluid source and the second clutch;
a first signal element producing a first control signal for activating the second changeover valve, whereby the state of the first clutch is changed in a pressure-less manner in response to said first control signal activating the second changeover valve; and
a second signal element producing a second control signal for activating the third changeover valve, whereby the state of the second clutch is changed in a pressure-less manner in response to said second control signal activating the third changeover valve.

* * * * *